US012720646B2

(12) United States Patent
Abi Aoun et al.

(10) Patent No.: US 12,720,646 B2
(45) Date of Patent: Aug. 25, 2026

(54) TEMPERATURE DETERMINATION

(71) Applicant: NICOVENTURES TRADING LIMITED, London (GB)

(72) Inventors: Walid Abi Aoun, London (GB); Gary Fallon, London (GB); Julian Darryn White, Cambridge (GB); Martin Daniel Horrod, Cambridge (GB)

(73) Assignee: NICOVENTURES TRADING LIMITED, London (GB)

( * ) Notice: Subject to any disclaimer, the term of this patent is extended or adjusted under 35 U.S.C. 154(b) by 1258 days.

(21) Appl. No.: 16/497,592

(22) PCT Filed: Mar. 27, 2018

(86) PCT No.: PCT/EP2018/057834
§ 371 (c)(1),
(2) Date: Sep. 25, 2019

(87) PCT Pub. No.: WO2018/178113
PCT Pub. Date: Oct. 4, 2018

(65) Prior Publication Data

US 2020/0022412 A1 Jan. 23, 2020

(30) Foreign Application Priority Data

Mar. 31, 2017 (GB) ..................................... 1705208

(51) Int. Cl.
*A24F 47/00* (2020.01)
*A24F 40/465* (2020.01)
(Continued)

(52) U.S. Cl.
CPC ............ *H05B 6/06* (2013.01); *A24F 40/465* (2020.01); *A24F 40/50* (2020.01); *G01K 7/16* (2013.01);
(Continued)

(58) Field of Classification Search
CPC .............. H05B 6/06; H05B 6/10; A24F 47/00
See application file for complete search history.

(56) References Cited

U.S. PATENT DOCUMENTS 5,613,505 A * 3/1997 Campbell ............. H05B 6/365
131/194
9,060,388 B2 6/2015 Liu
(Continued)

FOREIGN PATENT DOCUMENTS

AU 2018241908 B2 9/2020
AU 2020281092 A1 1/2021
(Continued)

OTHER PUBLICATIONS

Examination Report for Indian Application No. 201947043640, mailed on Aug. 11, 2020, 7 pages.
(Continued)

*Primary Examiner* — Ibrahime A Abraham
*Assistant Examiner* — Lawrence H Samuels
(74) *Attorney, Agent, or Firm* — MERCHANT & GOULD P.C.

(57) ABSTRACT

Disclosed are methods and an apparatus for determining a temperature of a susceptor of an aerosol generating device, the susceptor being for inductive heating by a RLC resonance circuit. The apparatus is arranged to determine a frequency characteristic of a peak of a frequency response of the RLC resonance circuit, and determine, based on the determined frequency characteristic, the temperature of the susceptor. Also disclosed is an aerosol generating device comprising the apparatus.

13 Claims, 5 Drawing Sheets

(51) Int. Cl.
*A24F 40/50* (2020.01)
*G01K 7/16* (2006.01)
*G01K 7/36* (2006.01)
*H05B 6/06* (2006.01)
*H05B 6/10* (2006.01)
*A24F 40/20* (2020.01)

(52) U.S. Cl.
CPC ............... *G01K 7/36* (2013.01); *H05B 6/105* (2013.01); *A24F 40/20* (2020.01)

(56) References Cited

U.S. PATENT DOCUMENTS

| | | | | |
|---|---|---|---|---|
| 10,028,533 | B2 * | 7/2018 | Fursa | H05B 6/105 |
| 10,085,303 | B2 * | 9/2018 | Schilling | H05B 6/062 |
| 10,412,789 | B2 * | 9/2019 | Henke | H05B 6/062 |
| 10,674,763 | B2 * | 6/2020 | Zinovik | H05B 6/04 |
| 2004/0149737 | A1 * | 8/2004 | Sharpe | A24F 40/465 219/635 |
| 2005/0066735 | A1 * | 3/2005 | Beavis | A61M 15/0068 73/649 |
| 2010/0313901 | A1 * | 12/2010 | Fernando | B65D 43/16 131/330 |
| 2011/0120989 | A1 * | 5/2011 | Schilling | H05B 6/062 219/661 |
| 2011/0316560 | A1 | 12/2011 | Gregg et al. | |
| 2012/0132647 | A1 * | 5/2012 | Beverly | H05B 6/062 219/620 |
| 2013/0199027 | A1 | 8/2013 | Singh et al. | |
| 2014/0015329 | A1 | 1/2014 | Widmer et al. | |
| 2015/0157756 | A1 | 6/2015 | Duffield et al. | |
| 2015/0245669 | A1 * | 9/2015 | Cadieux | A61M 15/06 131/329 |
| 2015/0320116 | A1 | 11/2015 | Bleloch et al. | |
| 2016/0088685 | A1 * | 3/2016 | Henke | H05B 6/062 99/332 |
| 2016/0150825 | A1 | 6/2016 | Mironov et al. | |
| 2016/0248280 | A1 | 8/2016 | Ben-Shalom et al. | |
| 2016/0295921 | A1 | 10/2016 | Mironov et al. | |
| 2017/0055575 | A1 | 3/2017 | Wilke et al. | |
| 2017/0055582 | A1 | 3/2017 | Blandino et al. | |
| 2017/0055583 | A1 | 3/2017 | Blandino et al. | |
| 2017/0055585 | A1 * | 3/2017 | Fursa | H05B 6/105 |
| 2017/0055587 | A1 * | 3/2017 | Zinovik | H03F 3/2176 |
| 2017/0231276 | A1 * | 8/2017 | Mironov | H05B 1/0244 131/328 |
| 2017/0238610 | A1 * | 8/2017 | Reevell | G06F 1/04 |
| 2018/0043114 | A1 * | 2/2018 | Bowen | A24F 40/60 |
| 2018/0214645 | A1 | 8/2018 | Reevell | |
| 2019/0098930 | A1 * | 4/2019 | Fallon | A24F 40/30 |
| 2020/0297031 | A1 * | 9/2020 | Zinovik | H05B 1/0244 |
| 2021/0093008 | A1 | 4/2021 | White et al. | |
| 2021/0093012 | A1 | 4/2021 | White et al. | |
| 2021/0186109 | A1 | 6/2021 | Milligan et al. | |

FOREIGN PATENT DOCUMENTS

| | | | |
|---|---|---|---|
| CA | 2989375 | A1 | 1/2017 |
| CN | 1495417 | A | 5/2004 |
| CN | 1545823 | A | 11/2004 |
| CN | 1679419 | A | 10/2005 |
| CN | 102186271 | A | 9/2011 |
| CN | 102539005 | A | 7/2012 |
| CN | 102575954 | A | 7/2012 |
| CN | 104095291 | A | 10/2014 |
| CN | 204440191 | U | 7/2015 |
| CN | 204599333 | U | 9/2015 |
| CN | 105264680 | A | 1/2016 |
| CN | 105307524 | A | 2/2016 |
| CN | 105307525 | A | 2/2016 |
| CN | 106455712 | A | 2/2017 |
| DE | 102009047185 | A1 | 6/2011 |
| EP | 0703735 | A1 | 4/1996 |
| EP | 0703735 | B1 | 7/2001 |
| EP | 2330866 | A2 | 6/2011 |
| EP | 2512205 | A1 | 10/2012 |
| EP | 2645814 | A1 | 10/2013 |
| EP | 2967156 | A1 | 1/2016 |
| EP | 2975958 | A1 | 1/2016 |
| EP | 2996504 | A1 | 3/2016 |
| EP | 2967156 | B1 | 11/2016 |
| EP | 2996504 | B1 | 11/2016 |
| EP | 3603333 | B1 | 6/2022 |
| IT | RM20120193 | A1 | 8/2012 |
| JP | H06295782 | A | 10/1994 |
| JP | H09257256 | A | 9/1997 |
| JP | 2011113977 | A | 6/2011 |
| JP | 2013054873 | A | 3/2013 |
| JP | 2013073939 | A | 4/2013 |
| JP | 5478735 | B2 | 4/2014 |
| JP | 5586433 | B2 | 9/2014 |
| JP | 2014229498 | A | 12/2014 |
| JP | 5662344 | B2 | 1/2015 |
| JP | 2016524777 | A | 8/2016 |
| JP | 2016525341 | A | 8/2016 |
| JP | 2017506915 | A | 3/2017 |
| KR | 100385395 | B1 | 8/2003 |
| KR | 20070093218 | A | 9/2007 |
| KR | 20150143877 | A | 12/2015 |
| KR | 20150143891 | A | 12/2015 |
| RU | 2135054 | C1 | 8/1999 |
| WO | 9406314 | A1 | 3/1994 |
| WO | 9527411 | A1 | 10/1995 |
| WO | 2011070785 | A1 | 6/2011 |
| WO | 2015177043 | A1 | 11/2015 |
| WO | 2015177256 | A1 | 11/2015 |
| WO | 2015177257 | A1 | 11/2015 |
| WO | 2015177294 | A1 | 11/2015 |
| WO | 2016184929 | A1 | 11/2016 |
| WO | 2017001819 | A1 | 1/2017 |
| WO | 2017085242 | A1 | 5/2017 |
| WO | 2017149093 | A1 | 9/2017 |
| WO | 2017205692 | A1 | 11/2017 |
| WO | 2018073376 | A1 | 4/2018 |
| WO | 2020047417 | A1 | 3/2020 |

OTHER PUBLICATIONS

Examination Report for Indonesian Application No. P00201908524, mailed on Dec. 24, 2021, 5 pages.

Examination Report for Indonesian Application No. P00201908525, mailed on Dec. 24, 2021, 5 pages.

Examination Report No. 1 for Australian Application No. 2020294182, mailed on Mar. 5, 2022, 3 pages.

International Preliminary Report on Patentability for Application No. PCT/EP2018/057835 mailed on Oct. 10, 2019, 15 pages.

International Preliminary Report on Patentability for Application No. PCT/EP2018/057834, mailed on Oct. 10, 2019, 13 pages.

International Search Report and Written Opinion for Application No. PCT/EP2018/057835, mailed on Nov. 6, 2018, 26 pages.

International Search Report and Written Opinion for Application No. PCT/EP2018/057834, mailed on Nov. 6, 2018, 20 pages.

International Search Report for Application No. PCT/US2019/049076, mailed on Dec. 18, 2019, 4 pages.

Invitation to Pay Additional Fees for Application No. PCT/EP2018/057835, mailed on Jul. 17, 2018, 20 pages.

Invitation to Pay Additional Fees with Partial International Search for Application No. PCT/EP2018/057834 mailed Jul. 13, 2018, 18 pages.

Office Action for Canadian Application No. 3,057,903, mailed on Dec. 15, 2020, 6 pages.

Office Action for Canadian Application No. 3,057,903, mailed on Aug. 30, 2021, 4 pages.

Office Action for Canadian Application No. 3,057,905, mailed on Jan. 20, 2021, 6 pages.

Office Action for Chinese Application No. 2018800231958, mailed on Apr. 21, 2021, 17 pages.

Office Action for Chinese Application No. 2018800231958, mailed on Dec. 17, 2021, 10 pages.

(56) References Cited

OTHER PUBLICATIONS

Office Action for Chinese Application No. 201880023195.8, mailed on Jun. 21, 2022, 4 pages.
Office Action for Japanese Application No. 2019-551462 mailed on Dec. 15, 2020, 4 pages.
Office Action for Japanese application No. 2019-551471, mailed on Apr. 20, 2021, 2 pages.
Office Action for Japanese Application No. 2019-551471 mailed on Dec. 15, 2020, 8 pages.
Office Action for Korean Application No. 10-2019-7032076, mailed on May 25, 2021, 4 pages.
Office Action for Korean Application No. 10-2020-7017740, mailed Feb. 8, 2022, 14 pages.
Office Action for Korean Application No. 10-2020-7017746, mailed Feb. 10, 2022, 25 pages.
Office Action mailed May 27, 2020 for Russian Application No. 2019134684, 8 pages.
Examination Report No. 1 for Australian Patent Application No. 2020281092, mailed on Oct. 13, 2021, 4 pages.
Extended European search report for Application No. 22168588.6, mailed on Oct. 6, 2022, 13 pages.
Extended European Search Report for Application No. 22175887.3, mailed on Oct. 21, 2022, 16 pages.
Notice to File a Response mailed Dec. 5, 2022 for Korean Application No. 10-2022-7014032, 25 pages.
Office action for Brazilian Application No. 112019020551-9, mailed on Sep. 13, 2022, 4 pages.
Office action for Brazilian Application No. 112019020557-8, mailed on Sep. 29, 2022, 7 pages.
Office action for Japanese Application No. 2021134922, mailed on Oct. 18, 2022, 5 pages.
Office action for Korean Application No. 10-2021-7042466, mailed on Sep. 21, 2022, 4 pages.
Office Action for Malaysian Application No. PI2019005294, mailed on Aug. 9, 2022, 4 pages.
"Office action received for Brazilian Application No. 112019020557-8, mailed on Sep. 19, 2023", 6 pages (3 pages of English Translation and 3 pages of Official Copy).
"Office Action received for Canadian Patent Application No. 3,057,905, mailed on Jul. 24, 2023", 3 pages (Official copy only).
"Office Action received for Mexican Patent Application No. MX/a/2019/011801, mailed on Dec. 5, 2022", 5 Pages (Official Copy Only).
"Office Action received for Russian Patent Application No. 201910733, mailed on Apr. 24, 2023", 6 pages (Official Copy Only).
Office Action and Search Report from Chinese Patent Application No. 2022110714375, mailed Mar. 24, 2025, 16 pages (8 pages original; 8 pages translation).

* cited by examiner

TEMPERATURE DETERMINATION

PRIORITY CLAIM

The present application is a National Phase entry of PCT Application No. PCT/EP2018/057834, filed Mar. 27, 2018, which claims priority from GB Patent Application No. 1705208.5, filed Mar. 31, 2017.

TECHNICAL FIELD

The present disclosure relates to an apparatus and methods for determining a temperature of a susceptor of an aerosol generating device, more particularly of a susceptor for inductive heating by a RLC resonance circuit.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

According to a first aspect of the present disclosure, there is provided an apparatus for determining a temperature of a susceptor of an aerosol generating device, the susceptor being for inductive heating by a RLC resonance circuit, the apparatus being arranged to: determine a frequency characteristic of a peak of a frequency response of the RLC resonance circuit; and determine, based on the determined frequency characteristic, the temperature of the susceptor.

The frequency characteristic may be a resonant frequency of the RLC resonance circuit.

The frequency characteristic may be indicative of a bandwidth of the peak of the frequency response of the RLC circuit.

The apparatus may be arranged to: determine data indicative of the temperature as a function of the frequency characteristic; wherein the temperature is determined based on the determined data and the determined frequency characteristic.

The data may comprise one or more parameters of a functional form describing the temperature as a function of the frequency characteristic.

The data may be a constant of proportionality between the temperature and the frequency characteristic.

The data may comprise a series of data points of the temperature measured as a function of the frequency characteristic.

The apparatus may be arranged to: determine, based on the determined frequency characteristic, a resistance of the RLC circuit; wherein the determination of the temperature is based on the determined resistance of the RLC circuit.

The apparatus may be arranged to: determine a temperature-resistance constant of the susceptor; wherein the determination of the temperature is based on the determined resistance and the determined temperature-resistance constant.

The apparatus may be arranged to: determine a reference characteristic indicative of the frequency characteristic at a reference temperature; compare the determined frequency characteristic to the determined reference characteristic; wherein the determination of the temperature is based on the comparison of the determined frequency characteristic to the reference characteristic.

The apparatus may be arranged to: measure the reference characteristic substantially on start-up of the aerosol generating device and/or substantially on installation of a new and/or replacement susceptor into the aerosol generating device and/or substantially on installation of a new and/or replacement inductor into the aerosol generating device.

The apparatus may be arranged to: measure an electrical property of the RLC circuit as a function of a driving frequency at which the RLC circuit is driven; wherein the determination of the frequency characteristic is based on the measured electrical property of the RLC circuit as a function of a driving frequency at which the RLC circuit is driven.

The electrical property may be a voltage measured across an inductor of the RLC circuit, the inductor being for energy transfer to the susceptor.

The measurement of the electrical property may be a passive measurement.

The electrical property may be indicative of a current induced into a sense coil by an inductor of the RLC circuit, the inductor being for energy transfer to the susceptor.

The electrical property may be indicative of a current induced in a pick-up coil by a supply voltage element, the supply voltage element being for supplying voltage to a driving element, the driving element being for driving the RLC circuit.

According to a second aspect of the present disclosure, there is provided an aerosol generating device comprising: a susceptor arranged to heat an aerosol generating material thereby to generate an aerosol in use; an RLC resonance circuit arranged to inductively heat the susceptor in use; and the apparatus according to the first aspect.

The susceptor may comprise nickel.

The susceptor may comprise a body having a nickel coating.

The nickel coating may have a thickness less than substantially 5 μm, or substantially in the range 2 μm to 3 μm.

The nickel coating may be electroplated on to the body.

The susceptor may comprise one or more of steel, iron and cobalt.

The susceptor may be a sheet of mild steel.

The sheet of mild steel may have a thickness in the range of substantially 10 μm to substantially 50 μm, or may have a thickness of substantially 25 μm.

According to a third aspect of the present disclosure, there is provided a method of determining a temperature of a susceptor of an aerosol generating device, the susceptor being for inductive heating by a RLC resonance circuit, the method comprising: determining a frequency characteristic of a peak of a frequency response of the RLC resonance circuit; and determining, based on the determined frequency characteristic, the temperature of the susceptor.

According to a fourth aspect of the present disclosure, there is provided a computer program which, when executed by a processing system, causes the processing system to perform the method according to the third aspect.

BRIEF DESCRIPTION OF THE DRAWINGS

Further features and advantages of the disclosure will become apparent from the following description of embodiments of the disclosure, given by way of example only, which is made with reference to the accompanying drawings.

DETAILED DESCRIPTION

Induction heating is a process of heating an electrically conducting object (or susceptor) by electromagnetic induction. An induction heater may comprise an electromagnet and a device for passing a varying electric current, such as an alternating electric current, through the electromagnet. The varying electric current in the electromagnet produces a varying magnetic field. The varying magnetic field penetrates a susceptor suitably positioned with respect to the electromagnet, generating eddy currents inside the susceptor. The susceptor has electrical resistance to the eddy currents, and hence the flow of the eddy currents against this resistance causes the susceptor to be heated by Joule heating. In cases whether the susceptor comprises ferromagnetic material such as Iron, Nickel or Cobalt, heat may also be generated by magnetic hysteresis losses in the susceptor, i.e. by the varying orientation of magnetic dipoles in the magnetic material as a result of their alignment with the varying magnetic field.

In inductive heating, as compared to heating by conduction for example, heat is generated inside the susceptor, allowing for rapid heating. Further, there need not be any physical contact between the inductive heater and the susceptor, allowing for enhanced freedom in construction and application.

Electrical resonance occurs in an electric circuit at a particular resonant frequency when the imaginary parts of impedances or admittances of circuit elements cancel each other. One example of a circuit exhibiting electrical resonance is a RLC circuit, comprising a resistance (R) provided by a resistor, an inductance (L) provided by an inductor, and a capacitance (C) provided by a capacitor, connected in series. Resonance occurs in an RLC circuit because the collapsing magnetic field of the inductor generates an electric current in its windings that charges the capacitor, while the discharging capacitor provides an electric current that builds the magnetic field in the inductor. When the circuit is driven at the resonant frequency, the series impedance of the inductor and the capacitor is at a minimum, and circuit current is at a maximum. The resonant frequency and the bandwidth of the RLC resonance circuit depend on the capacitance, inductance and resistance in the circuit.

Figure 1:
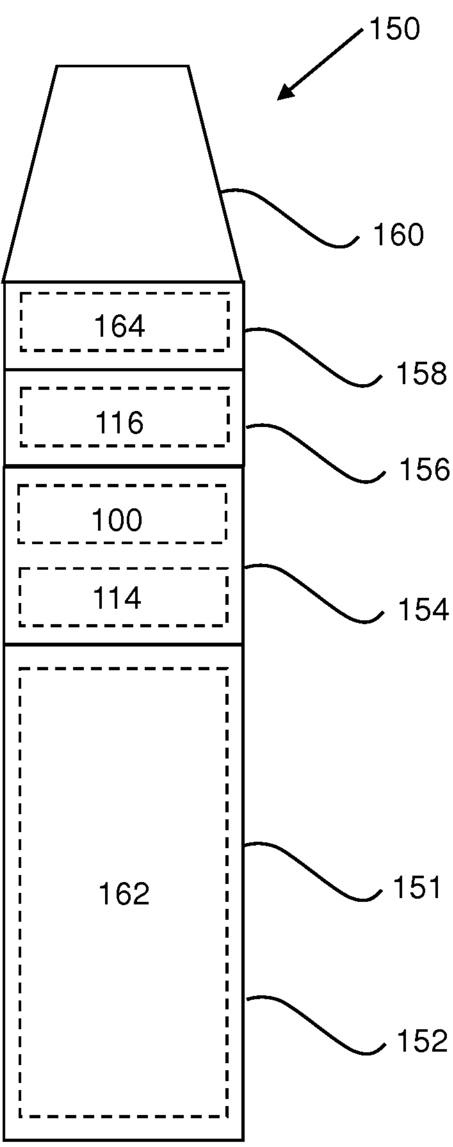
FIG. 1 illustrates schematically an aerosol generating device according to an example.

FIG. 1 illustrates schematically an example aerosol generating device 150 comprising an RLC resonance circuit 100 for inductive heating of an aerosol generating material 164 via a susceptor 116. In some examples, the susceptor 116 and the aerosol generating material 164 form an integral unit that may be inserted and/or removed from the aerosol generating device 150, and may be disposable. The aerosol generating device 150 is hand-held. The aerosol generating device 150 is arranged to heat the aerosol generating material 164 to generate aerosol for inhalation by a user.

It is noted that, as used herein, the term "aerosol generating material" includes materials that provide volatilized components upon heating, typically in the form of vapor or an aerosol. Aerosol generating material may be a non-tobacco-containing material or a tobacco-containing material. Aerosol generating material may, for example, include one or more of tobacco per se, tobacco derivatives, expanded tobacco, reconstituted tobacco, tobacco extract, homogenized tobacco or tobacco substitutes. The aerosol generating material can be in the form of ground tobacco, cut rag tobacco, extruded tobacco, reconstituted tobacco, reconstituted material, liquid, gel, gelled sheet, powder, or agglomerates, or the like. Aerosol generating material also may include other, non-tobacco, products, which, depending on the product, may or may not contain nicotine. Aerosol generating material may comprise one or more humectants, such as glycerol or propylene glycol.

Returning to FIG. 1, the aerosol generating device 150 comprises an outer body 151 housing the RLC resonance circuit 100, the susceptor 116, the aerosol generating material 164, a controller 114, and a battery 162. The battery is arranged to power the RLC resonance circuit 100. The controller 114 is arranged to control the RLC resonance circuit 100, for example control the voltage delivered to the RLC resonance circuit 100 from the battery 162, and the frequency fat which the RLC resonance circuit 100 is driven. The RLC resonance circuit 100 is arranged for inductive heating of the susceptor 116. The susceptor 116 is arranged to heat the aerosol generating material 364 to generate an aerosol in use. The outer body 151 comprises a mouthpiece 160 to allow aerosol generated in use to exit the device 150.

In use, a user may activate, for example via a button (not shown) or a puff detector (not shown) which is known per se, the controller 114 to cause the RLC resonance circuit 100 to be driven, for example at the resonant frequency $f_r$ of the RLC resonance circuit 100. The resonance circuit 100 thereby inductively heats the susceptor 116, which in turn heats the aerosol generating material 164, and causes the aerosol generating material 164 thereby to generate an aerosol. The aerosol is generated into air drawn into the device 150 from an air inlet (not shown), and is thereby carried to the mouthpiece 160, where the aerosol exits the device 150.

The controller 114 and the device 150 as a whole may be arranged to heat the aerosol generating material to a range of temperatures to volatilize at least one component of the aerosol generating material without combusting the aerosol generating material. For example, the temperature range may be about 50° C. to about 350° C., such as between about 50° C. and about 250° C., between about 50° C. and about 150° C., between about 50° C. and about 120° C., between about 50° C. and about 100° C., between about 50° C. and about 80° C., or between about 60° C. and about 70° C. In some examples, the temperature range is between about 170° C. and about 220° C. In some examples, the temperature range may be other than this range, and the upper limit of the temperature range may be greater than 300° C.

It is desirable to determine the temperature of the susceptor 116, for example for the purposes of controlling heating of the aerosol generating material 164, for example to ensure that it is not heated beyond a certain temperature, for example so that it does not burn or char, or so that it is heated at a certain temperature or according to a certain temperature profile, for example. For example, it may be desirable that the temperature of the susceptor 116 does not exceed 400° C., in order to ensure that the susceptor 116 does not cause the aerosol generating material 164 to burn or char. It will be appreciated that there may be a difference between the temperature of the susceptor 116 and the temperature of the aerosol generating material 164 as a whole, for example during heating up of the susceptor 116, for example where the rate of heating is large. It will therefore be appreciated that in some examples the temperature at which the susceptor 116 is controlled to be or which it should not exceed may be higher than the temperature to which the aerosol generating material 164 is desired to be heated or which it should not exceed, for example.

According to examples of the present disclosure, an apparatus (for example the controller 114), is arranged to determine the temperature of the susceptor 116. In broad overview, and as described in more detail below, the controller 114 is arranged to determine a frequency characteristic of a peak of a frequency response of the RLC resonance circuit 100. The frequency characteristic varies with varying temperature of the susceptor 116. The frequency characteristic may be for example the resonant frequency or the bandwidth of the peak. The controller is arranged to determine the temperature of the susceptor 116 based on the determined frequency characteristic. Determining the temperature of the susceptor 116 based on a frequency characteristic of a peak of a frequency response of the RLC resonance circuit 100 allows for a determination of the temperature of the susceptor 116 without requiring physical contact with the susceptor 116, and hence allows for greater design freedom of the aerosol generating device 150, for example.

Figure 2A:
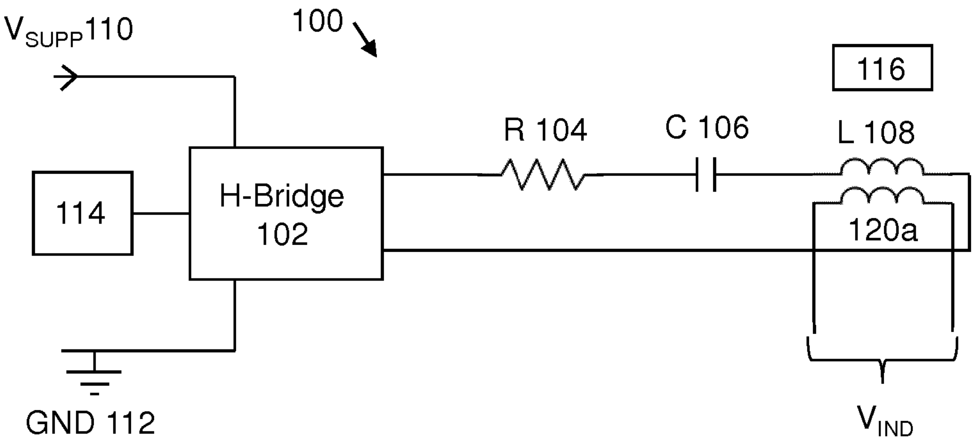
FIG. 2*a* illustrates schematically an RLC resonance circuit according to a first example.

Referring now to FIG. 2*a*, there is illustrated an example RLC resonance circuit 100 for inductive heating of the susceptor 116. The resonance circuit 100 comprises a resistor 104, a capacitor 106, and an inductor 108 connected in series. The resonance circuit 100 has a resistance R, an inductance L and a capacitance C.

The inductance L of the circuit 100 is provided by the inductor 108 arranged for inductive heating of the susceptor 116. The inductive heating of the susceptor 116 is via an alternating magnetic field generated by the inductor 108, which as mentioned above induces Joule heating and/or magnetic hysteresis losses in the susceptor 116. A portion of the inductance L of circuit 100 may be due to the magnetic permeability of the susceptor 116. The alternating magnetic field generated by the inductor 108 is generated by an alternating current flowing through the inductor 108. The alternating current flowing through the inductor 108 is an alternating current flowing through the RLC resonance circuit 100. The inductor 108 may, for example, be in the form of a coiled wire, for example a copper coil. The inductor 108 may comprise, for example, a Litz wire, for example a wire comprising a number of individually insulated wires twisted together. Litz wires may be particularly useful when drive frequencies f in the MHz range are used, as this may reduce power loss due to the skin effect, as is known per se. At these relatively high frequencies, lower values of inductance are required. As another example, the inductor 108 may be a coiled track on a printed circuit board. Using a coiled track on a printed circuit board may be useful as it provides for a rigid and self-supporting track, with a cross section which obviates any requirement for Litz wire (which may be expensive), which can be mass produced with a high reproducibility for low cost. Although one inductor 108 is shown, it will be readily appreciated that there may be more than one inductor arranged for inductive heating of one or more susceptors 116.

The capacitance C of the circuit 100 is provided by the capacitor 106. The capacitor 106 may be, for example, a Class 1 ceramic capacitor, for example a COG capacitor. The capacitance C may also comprise the stray capacitance of the circuit 100; however, this is or can be made negligible compared with the capacitance C provided by the capacitor 106.

The resistance R of the circuit 100 is provided by the resistor 104, the resistance of the track or wire connecting the components of the resonance circuit 100, the resistance of the inductor 108, and the resistance to current flowing in the resonance circuit 100 provided by the susceptor 116 arranged for energy transfer with the inductor 108. It will be appreciated that the circuit 100 need not necessarily comprise a resistor 104, and that the resistance R in the circuit 100 may be provided by the resistance of the connecting track or wire, the inductor 108 and the susceptor 116.

The circuit 100 is driven by H-Bridge driver 102. The H-Bridge driver 102 is a driving element for providing an alternating current in the resonance circuit 100. The H-Bridge driver 102 is connected to a DC voltage supply $V_{SUPP}$ 110, and to an electrical ground GND 112. The DC voltage supply $V_{SUPP}$ 110 may be, for example, from the battery 162. The H-Bridge 102 may be an integrated circuit, or may comprise discrete switching components (not shown), which may be solid-state or mechanical. The H-bridge driver 102 may be, for example, a High-efficiency Bridge Rectifier. As is known per se, the H-Bridge driver 102 may provide an alternating current in the circuit 100 from the DC voltage supply $V_{SUPP}$ 110 by reversing (and then restoring) the voltage across the circuit via switching components (not shown). This may be useful as it allows the RLC resonance circuit to be powered by a DC battery, and allows the frequency of the alternating current to be controlled.

The H-Bridge driver 104 is connected to a controller 114. The controller 114 controls the H-Bridge 102 or components thereof (not shown) to provide an alternating current I in the RLC resonance circuit 100 at a given drive frequency f. For example, the drive frequency f may be in the MHz range, for example 0.5 MHz to 4 MHz, for example in the range 2 MHz to 3 MHz. It will be appreciated that other frequencies f or frequency ranges may be used, for example depending on the particular resonance circuit 100 (and/or components thereof), controller 114, susceptor 116 and/or driving element 102 used. For example, it will be appreciated that the resonant frequency $f_r$ of the RLC circuit 100 is dependent on the inductance L and capacitance C of the circuit 100, which in turn is dependent on the inductor 108, capacitor 106 and susceptor 116. The range of drive frequencies f may be around the resonant frequency $f_r$ of the particular RLC circuit 100 and/or susceptor 116 used, for example. It will also be appreciated that resonance circuit 100 and/or drive frequency or range of drive frequencies f used may be selected based on other factors for a given susceptor 116. For example, in order to improve the transfer of energy from the inductor 108 to the susceptor 116, it may be useful to provide that the skin depth (i.e. the depth from the surface of the susceptor 116 within which the alternating magnetic field from the inductor 108 is absorbed) is less, for example a factor of two to three times less, than the thickness of the susceptor 116 material. The skin depth differs for different materials and construction of susceptors 116, and reduces with increasing drive frequency f. In some examples, therefore, it may be beneficial to use relatively high drive frequencies f. On the other hand, for example, in order to reduce the proportion of power supplied to the resonance circuit 100 and/or driving element 102 that is lost as heat within the electronics, it may be beneficial to use lower drive frequencies f. In some examples, a compromise between these factors may therefore be chose as appropriate and/or desired.

As mentioned above, the controller 114 is arranged to determine the temperature of the susceptor 116 by determining a frequency characteristic of a peak of the frequency response of the RLC resonance circuit 100, and determining the temperature of the susceptor 116 based on the determined characteristic.

Figure 3A:
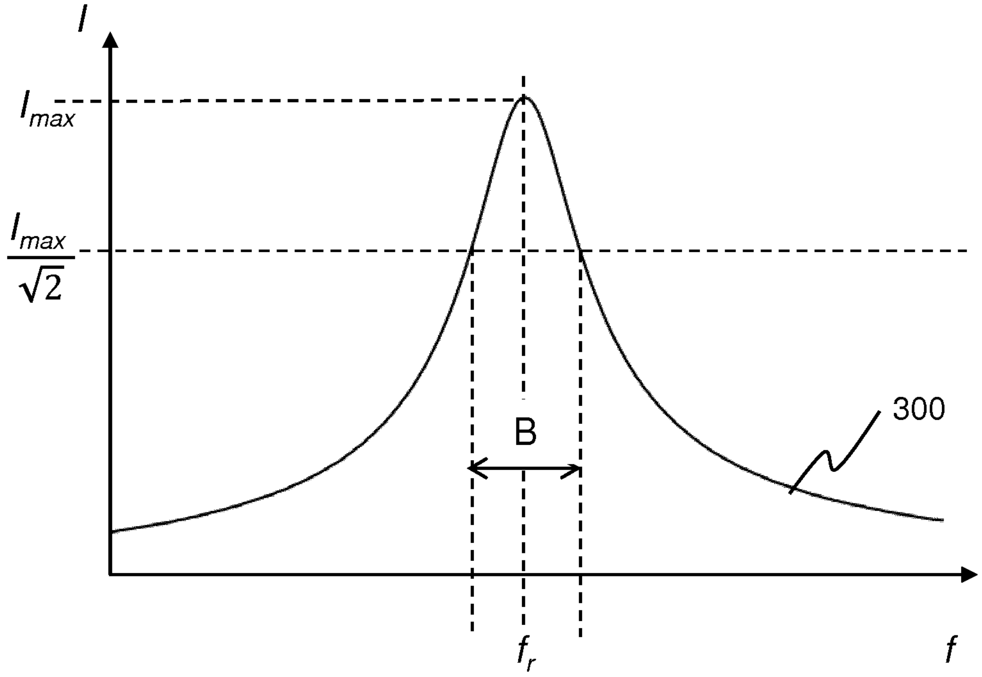
FIG. 3*a* illustrates schematically an example frequency response of an example RLC resonance circuit.

FIG. 3*a* illustrates schematically a frequency response 300 of the resonance circuit 100. In the example of FIG. 3*a*, the frequency response 300 of the resonance circuit 100 is illustrated by a schematic plot of the current I flowing in the circuit 100 as a function of the drive frequency f at which the circuit is driven by the H-Bridge driver 104.

The resonance circuit 100 of FIG. 2*a* has a resonant frequency $f_r$ at which the series impedance Z of the inductor 108 and the capacitor 106 is at a minimum, and hence the circuit current I is maximum. Hence, as illustrated in FIG. 2*a*, when the H-Bridge driver 104 drives the circuit 100 at the resonant frequency $f_r$, the alternating current I in the circuit 100, and hence in the inductor 108, will be maximum $I_{max}$. The oscillating magnetic field generated by the inductor 106 will therefore be maximum, and hence the inductive heating of the susceptor 116 by the inductor 106 will be maximum. When the H-Bridge driver 104 drives the circuit 100 at a frequency f that is off-resonance, i.e. above or below the resonant frequency $f_r$, the alternating current I in the circuit 100, and hence the inductor 108, will be less than maximum, and hence the oscillating magnetic field generated by the inductor 106 will be less than maximum, and hence the inductive heating of the susceptor 116 by the inductor 106 will be less than maximum. As can be seen in FIG. 3*a* therefore, the frequency response 300 of the resonance circuit 100 has a peak, centered on the resonant frequency $f_r$, and tailing off at frequencies above and below the resonant frequency $f_r$.

As mentioned above, the controller 114 is arranged to determine a frequency characteristic of the peak of the frequency response 300 of the RLC resonance circuit 100. The characteristic of the peak of the frequency response 300 of the resonant circuit 100 may be the resonant frequency $f_r$ about which the peak is centered, for example. As another example, the characteristic of the peak of the frequency response 300 of the resonant circuit 100 may be a width of the peak. The width of the peak may be characterized by the bandwidth B of the peak, which in the example illustrated in FIG. 2*a* is the full width of the peak at $I_{max}/\sqrt{2}$.

In some examples, in order to determine the frequency characteristic of the peak, the controller 114 is arranged to measure a frequency response 300 of the RLC resonance circuit 100. For example, the controller may be arranged to measure an electrical property of the RLC circuit 100 as a function of the driving frequency f at which the RLC circuit is driven. The controller 114 may comprise a clock generator (not shown) to determine the absolute frequency at which the RLC circuit 100 is to be driven. The controller 114 may be arranged to control the H-bridge 104 to scan through a range of drive frequencies f over a period of time. The electrical property of the RLC circuit 100 may be measured during the scan of drive frequencies, and hence the frequency response 300 of the RLC circuit 100 as a function of the driving frequency f may be determined.

The measurement of the electrical property may be a passive measurement i.e. a measurement not involving any direct electrical contact with the resonance circuit 100.

For example, referring again to the example shown in FIG. 2*a*, the electrical property may be indicative of a current induced into a sense coil 120*a* by the inductor 108 of the RLC circuit 100. As illustrated in FIG. 2*a*, the sense coil 120*a* is positioned for energy transfer from the inductor 108, and is arranged to detect the current I flowing in the circuit 100. The sense coil 120*a* may be, for example, a coil of wire, or a track on a printed circuit board. For example, in the case the inductor 108 is a track on a printed circuit board, the sense coil 120*a* may be a track on a printed circuit board and positioned above or below the inductor 108, for example in a plane parallel to the plane of the inductor 108. As another example, in the example where there is more than one inductor 108, the sense coil 120*a* may be placed between the inductors 108, for energy transfer from both of the inductors. For example in the case of the inductors 108 being tracks on a printed circuit board and lying in a plane parallel to one another, the sense coil 120*a* may be a track on a printed circuit board in-between the two inductors, and in a plane parallel to the inductors 108.

In any case, the alternating current I flowing in the circuit 100 and hence the inductor 108 causes the inductor 108 to generate an alternating magnetic field. The alternating magnetic field induces a current into the sense coil 120*a*. The current induced into the sense coil 120*a* produces a voltage $V_{IND}$ across the sense coil 120*a*. The voltage $V_{IND}$ across the sense coil 120*a* can be measured, and is proportional to the current I flowing in RLC circuit 100. The voltage $V_{IND}$ across the sense coil 120*a* may be recorded as a function of the drive frequency f at which the H-Bridge driver 104 is driving the resonance circuit 100, and hence a frequency response 300 of the circuit 100 determined. For example, the controller 114 may record a measurement of the voltage $V_{IND}$ across the sense coil 120*a* as a function of the frequency f at which it is controlling the H-Bridge driver 104 to drive the alternating current in the resonance circuit 100. The controller may then analyze the frequency response 300 to determine a frequency characteristic of a peak of the frequency response 300, for example the resonant frequency f about which the peak is centered, or the bandwidth B of the peak.

Figure 2B:
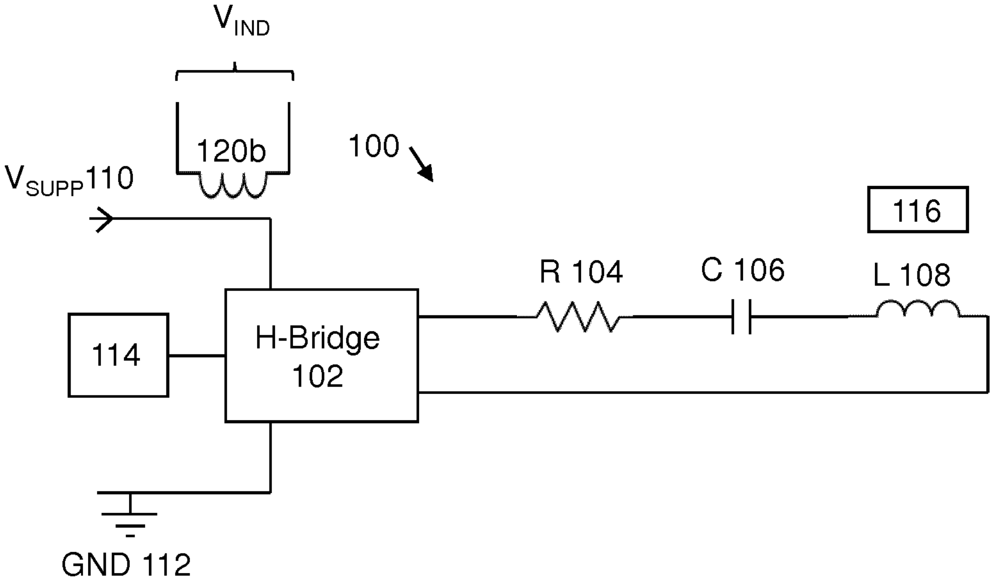
FIG. 2*b* illustrates schematically and RLC resonance circuit according to a second example.

FIG. 2*b* illustrates another example passive measurement of an electrical property of the RLC circuit 100. FIG. 2*b* is the same as FIG. 2*a* except in that the sense coil 120*a* of FIG. 2*a* is replaced by a pick-up coil 120*b*. As illustrated in FIG. 2*b*, the pick-up coil 120*b* is placed so as to intercept a portion of a magnetic field produced by the DC supply voltage wire or track 110 when the current flowing therethrough changes due to changing demands of the RLC circuit 100. The magnetic field produced by the changes in current flowing in the DC supply voltage wire or track 110 induces a current in the pick-up coil 120*b*, which produces a voltage $V_{IND}$ across the pick-up coil 120*b*. For example, although in an ideal case the current flowing in the DC supply voltage wire or track 110 would be direct current only, in practice the current flowing in the DC supply voltage wire or track 110 may be modulated to some extent by the H-Bridge driver 104, for example due to imperfections in the switching in the H-Bridge driver 104. These current modulations accordingly induce a current into the pick-up coil, which are detected via the voltage $V_{IND}$ across the pick-up coil 120b.

The voltage $V_{IND}$ across the pick-up coil 120b can be measured and recorded as a function of the drive frequency f at which the H-Bridge driver 104 is driving the resonance circuit 100, and hence a frequency response 300 of the circuit 100 determined. For example, the controller 114 may record a measurement of the voltage $V_{IND}$ across the pick-up coil 120a as a function of the frequency f at which it is controlling the H-Bridge driver 104 to drive the alternating current in the resonance circuit 100. The controller may then analyze the frequency response 300 to determine a frequency characteristic of a peak of the frequency response 300, for example the resonant frequency $f_r$ about which the peak is centered, or the bandwidth B of the peak.

It is noted that in some examples it may be desirable to reduce or remove the modulated component of the current in the DC supply voltage wire or track 110 that may be caused by imperfections in the H-Bridge driver 104. This may be achieved, for example, by implementing a bypass capacitor (not shown) across the H-bridge driver 104. It will be appreciated that in this case, the electrical property of the RLC circuit 100 used to determine the frequency response 300 of the circuit 100 may be measured by means other than the pick-up coil 120b.

Figure 2C:
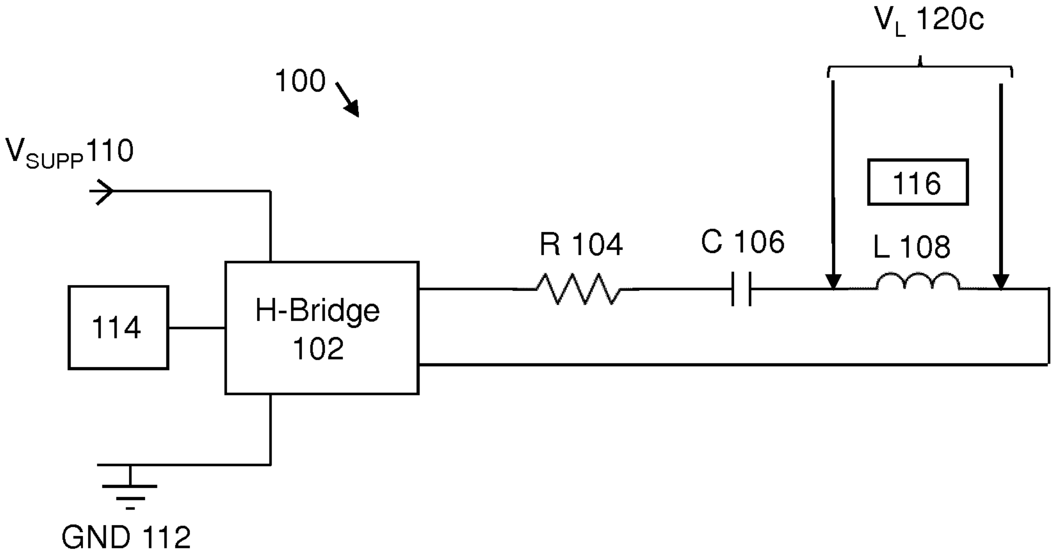
FIG. 2*c* illustrates schematically an RLC resonance circuit according to a third example.

FIG. 2c illustrates an example of an active measurement of an electrical property of the RLC circuit. FIG. 2c is the same as FIG. 2a except in that the sense coil 120a of FIG. 2a is replaced by an element 120c, for example a passive differential circuit 120c, arranged to measure the voltage $V_L$ across the inductor 108. As the current I in the resonance circuit 100 changes, the voltage $V_L$ across the inductor 108 will change. The voltage $V_L$ across the inductor 108 can be measured and recorded as a function of the drive frequency f at which the H-Bridge driver 104 drives the resonance circuit 100, and hence a frequency response 300 of the circuit 100 determined. For example, the controller 114 may record a measurement of the voltage $V_L$ across the inductor 108 as a function of the frequency f at which it is controlling the H-Bridge driver 104 to drive the alternating current in the resonance circuit 100. The controller 114 may then analyze the frequency response 300 to determine a frequency characteristic of a peak of the frequency response 300, for example the resonant frequency $f_r$ about which the peak is centered, or the bandwidth B of the peak.

In each of the examples illustrated in FIGS. 2a to 2c, or otherwise, the controller 114 may analyze the frequency response 300 to determine a frequency characteristic of a peak of the frequency response 300, for example the resonant frequency $f_r$ about which the peak is centered, or the bandwidth B of the peak. For example, the controller 114 may use known data analysis techniques to determine from the frequency characteristics of the peak. For example, the controller may infer the resonant frequency $f_r$ and/or the bandwidth B directly from the frequency response data. For example, for the resonant frequency $f_r$, the controller 114 may determine the frequency f at which the largest response was recorded as the resonant frequency $f_r$, or may determine the frequencies f for which the two largest responses were recorded and determine the average of these two frequencies f as the resonant frequency $f_r$. For the bandwidth B, the controller 114 may determine the frequencies f at which the response was $1/\sqrt{2}$ of the largest response, and determine the difference between these two frequencies as the bandwidth B, for example. As yet another example, the controller 114 may fit a function describing current I (or another response) as a function of frequency f for an RLC circuit to the frequency response data, and infer or calculate from the fitted function the resonant frequency $f_r$ and/or the bandwidth B of the peak of the frequency response data.

As mentioned above, the controller 114 is arranged to determine the temperature of the susceptor 116 based on the determined frequency characteristic of the peak of the frequency response 300 of the resonance circuit 100.

In one example, the characteristic of the peak of the frequency response 300 of the resonant circuit 100 is the resonant frequency $f_r$ about which the peak is centered, for example measured in Hz. The resonant frequency $f_r$ of the circuit 100 is dependent on the capacitance C and inductance L of the circuit 100, and is given by:

$$f_r = \frac{1}{\sqrt{LC}} \tag{1}$$

The inductance L of the inductor 108 and hence of the resonance circuit 100 is dependent on the magnetic permeability μ of the susceptor 116. Magnetic permeability μ is a measure of the ability of a material to support the formation of a magnetic field within itself, and expresses the degree of magnetization that a material obtains in response to an applied magnetic field. The greater the magnetic permeability μ of the susceptor 116, the greater the inductance L. The magnetic permeability μ of a material from which the susceptor 116 is comprised may change with temperature.

For example, for ferromagnetic and ferrimagnetic materials such as iron, nickel, cobalt and their alloys, their saturation magnetization (i.e. the maximum magnetization obtainable for an applied magnetic field) decreases as the temperature of the material approaches their Curie temperature $T_c$, at which temperature the permanent magnetic properties of the material are lost. For example, the Curie temperature $T_c$ of nickel is 358° C., and the relative change in saturation magnetization for nickel at 250° C. as compared to at 358° C. is greater than 50%. Hence in this case, as the temperature of the susceptor 116 increases to approach the Curie temperature $T_c$, the magnetic permeability μ of the susceptor 116 will decrease and hence the inductance L in the resonance circuit 100 will decrease, and hence, via equation (1), the resonant frequency $f_r$ about which the peak is centered will increase.

Figure 3B:
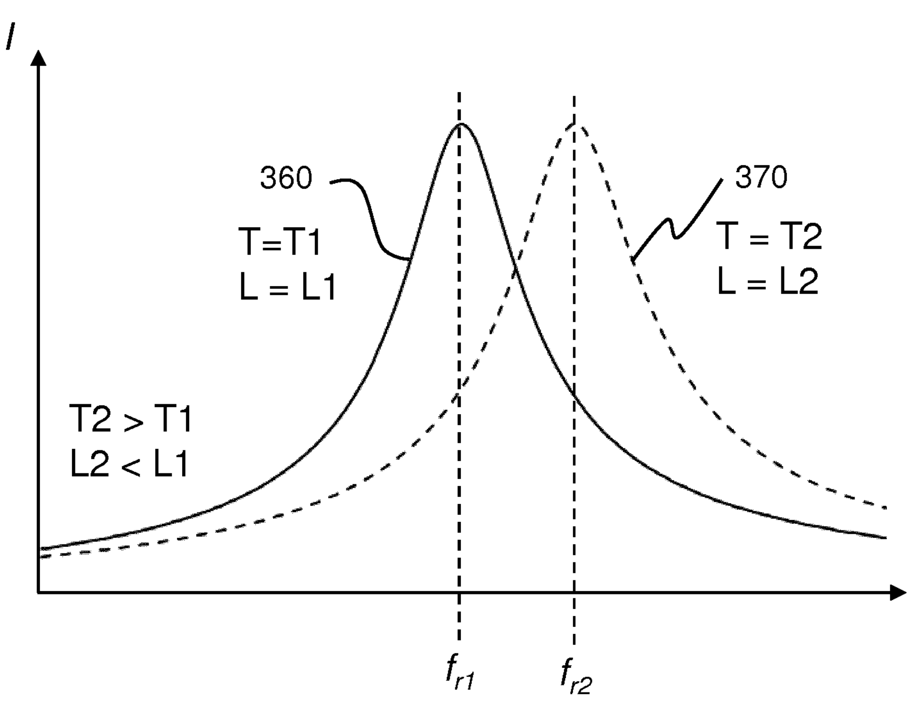
FIG. 3*b* illustrates schematically an example frequency response of an example RLC resonance circuit, at two different susceptor temperatures T1 and T2, according to an example.

FIG. 3b illustrates schematically a frequency response 360, 370 of the resonance circuit 100 for which the susceptor 116 is at two different temperatures T1 (solid curve 360) and T2 (dashed curve 370), where T2 is higher than T1. In the example of FIG. 3b, the frequency response 360, 370 of the resonance circuit 100 is illustrated by a schematic plot of the current I flowing in the circuit 100 as a function of the drive frequency f at which the circuit 100 is driven. As mentioned above, when the susceptor 116 is at the lower temperature T1, the inductance L of the circuit 100 is L1, and the resonant frequency $f_r$ is $f_{r1}$. However, when the susceptor 116 is at the higher temperature T2 (which is below but approaching the Curie temperature $T_c$ of the material from which the susceptor 116 is comprised), the inductance L of the circuit 100 decreases to L2, and hence the resonant frequency $f_r$ of the circuit 100 increases to $f_{r2}$.

Therefore, by determining the resonant frequency $f_r$ of the circuit 100, the controller 114 may determine, for example infer or calculate (as described in more detail below), the temperature of the susceptor 116.

Using the resonant frequency $f_r$ of the circuit 100 to determine the temperature of the susceptor 116 may be useful in cases, for example, where the working temperature range of the susceptor 116 (i.e. the range of temperatures to which the susceptor 116 is to be heated in the aerosol generating device 150) is below the curie temperature $T_c$ of the susceptor 116 (or a material that the susceptor 116 comprises). This may avoid a given resonant frequency $f_r$ corresponding to more than one temperature of the susceptor 116, and hence allow for a more accurate temperature measurement. Moreover, using the resonant frequency $f_r$ of the circuit 100 to determine the temperature of the susceptor 116 may be useful in cases, for example, where the working temperature range of the susceptor 116 in the region of, i.e. approaching, the Curie temperature $T_c$ of the susceptor 116 (or a material that the susceptor 116 comprises). This is because the saturation magnetization of ferromagnetic or ferromagnetic materials changes more rapidly as a function of temperature in the region of, i.e. approaching, the Curie temperature $T_c$ of the material, as compared to at temperatures remote from the Curie temperature $T_c$ of the material. Therefore, in the region of, i.e. approaching, the Curie temperature $T_c$ of the material, a given temperature change will result in a larger change in saturation magnetization of the susceptor 166, and hence change in resonant frequency $f_r$ of the resonance circuit 100, and hence will allow for a more sensitive measurement of temperature of the susceptor 116.

As a specific example, the susceptor 116 may comprise nickel. For example the susceptor 116 may comprise a body or substrate having a thin nickel coating. For example, the body may be a sheet of mild steel with a thickness of about 25 μm. In other examples, the sheet may be made of a different material such as aluminum or plastic or stainless steel or other non-magnetic materials and/or may have a different thickness, such as a thickness of between 10 μm and 50 μm. The body may be coated or electroplated with nickel. The nickel may for example have a thickness of less than 5 μm, such as between 2 μm and 3 μm. The coating or electroplating may be of another material. Providing the susceptor 116 with only a relatively small thickness may help to reduce the time required to heat the susceptor 116 in use. A sheet form of the susceptor 116 may allow a high degree of efficiency of heat coupling from the susceptor 116 to the aerosol generating material 164. The susceptor 116 may be integrated into a consumable comprising the aerosol generating material 164. A thin sheet of susceptor 116 material may be particularly useful for this purpose. The susceptor 116 may be disposable. Such a susceptor 116 may be cost effective.

Nickel is ferromagnetic. The Curie temperature $T_c$ of nickel is 358° C. In one example, the nickel-coated or plated susceptor 116 may be heated to temperatures in the range of about 200° C. to about 300° C., which may be the working range of the aerosol generating device 350. The change in saturation magnetization of nickel at 250° C. is 50% relative to the value at ambient temperatures. Hence in this case, measuring the resonant frequency $f_r$ of the resonance circuit 100 will allow for an accurate and sensitive determination of the temperature of the susceptor 116.

However, other materials which the susceptor 116 may comprise or be made of, such as iron or cobalt or mild steel, may have a higher Curie temperature $T_c$ that may be relatively remote from the working temperature range of the susceptor 116 in a given aerosol generating device 350. For example, a susceptor 116 of mild steel may have a Curie temperature $T_c$ of around 770° C. In this case, the change in saturation magnetization of the material such as steel at 250° C. may be relatively small, for example less than 10% relative to the value at ambient temperatures, and hence the resulting change in inductance L, and hence resonant frequency $f_r$, of the circuit 100 at different temperatures in the example working range may be relatively small.

It may be beneficial to use a material for the susceptor 116 for which the Curie temperature $T_c$ is remote from and above the working temperature range of the device, as this may help to avoid the reduction in inductive heating efficiency that may occur with a reduction in the saturation magnetization of the material near the Curie temperature $T_c$.

Another characteristic of the peak of the frequency response 300 of the resonant circuit 100 is a width of the peak. The width of the peak may be characterized by the bandwidth B of the peak. The bandwidth B of the peak is the full width of the peak in Hz at $I_{max}/\sqrt{2}$. The bandwidth B of the peak is dependent on the inductance L and the resistance R of the series resonance circuit 100, and is given by:

$$B = \frac{R}{L} \tag{1}$$

As mentioned above, the resistance R of the circuit 100 is provided at least in part by the resistance of the susceptor 116 to the eddy currents inducted within it by the inductor 108, which in turn adds to the resistance of the inductor 108 arranged for inductive heating of the susceptor 116. The resistance R of the susceptor 116 (and hence of the inductor 108 and hence circuit 100) may vary with the temperature of the susceptor 116.

For example, for susceptors 116 comprising conductors, such as iron, cobalt or steel, the resistance R increases with increasing temperature, for example increases linearly or near linearly, or at least monotonically, with increasing temperature of the susceptor 116. Therefore, as the temperature of the susceptor 116 increases, the resistance of the susceptor 116 increases, which in turn increases the resistance of the inductor 108, which in turn increases the resistance R of the resonance RLC circuit 100, which in turn, via equation (2), increases the bandwidth B of the peak of the response of the resonance circuit 100.

Figure 3C:
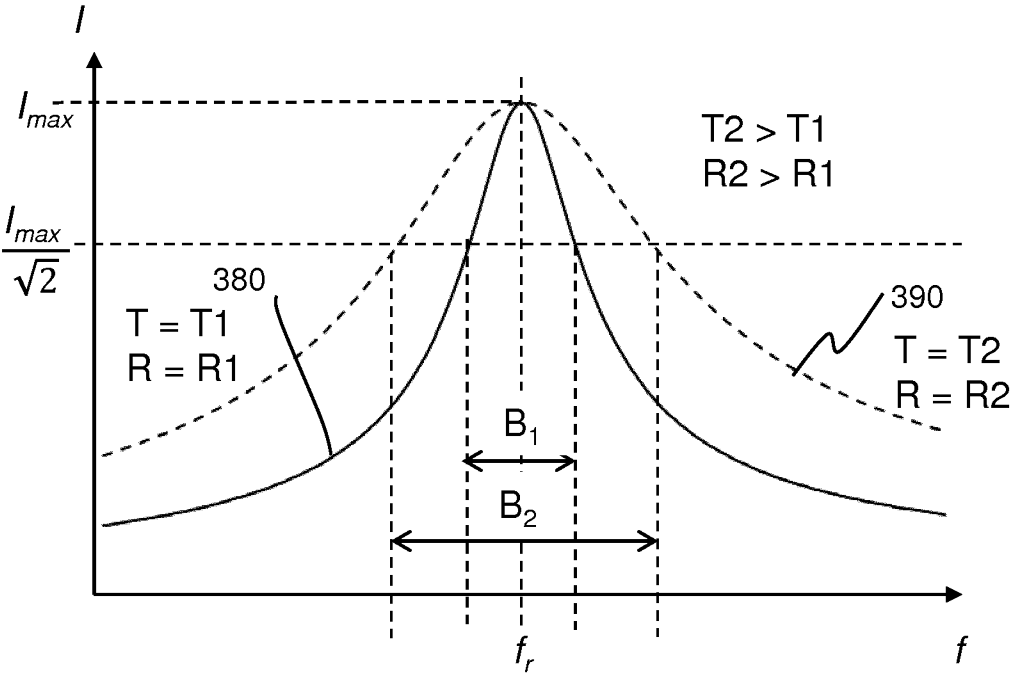
FIG. 3*c* illustrates schematically an example frequency response of an example RLC resonance circuit, at two different susceptor temperatures T1 and T2, according to another example.

FIG. 3*c* illustrates schematically a frequency response 380, 390 of the resonance circuit 100 for which the susceptor 116 is at two different temperatures T1 (solid curve 380) and T2 (dashed curve 390), where T2 is higher than T1. In the example of FIG. 3*c*, the frequency response of the resonance circuit 100 is illustrated by a schematic plot of the current I flowing in the circuit 100 as a function of the drive frequency fat which the circuit 100 is driven. When the susceptor 116 is at the lower temperature T1, the resistance R of the circuit 100 is R1, and the bandwidth B of the peak is B1. However, as mentioned above, when the susceptor 116 is at the higher temperature T2, the resistance R of the circuit 100 increases to R2, and hence the bandwidth B of the peak of the response of the resonance circuit 100 increases to B2.

Therefore, by determining the bandwidth B of the peak of the response 380, 390 of the circuit 100, the controller 114 may determine, for example infer or calculate (as described in more detail below), the temperature of the susceptor 116.

Using the bandwidth B of the peak of the response 380, 390 of the circuit 100 to determine the temperature of the susceptor 116 may be useful in cases, for example, where the working temperature range of the susceptor 116 (i.e. the range of temperatures to which the susceptor 116 is to be heated in the aerosol generating device 350) is remote from, i.e. not approaching, the curie temperature $T_c$ of the susceptor 116 (or a material from which the susceptor 116 is made). In these cases, the inductance L of the circuit 100 may remain relatively constant at different temperatures, and hence the resistance R of the circuit 100, and hence temperature of the susceptor 116, may be determined directly from the determined bandwidth B. This allows for a simple determination of the temperature of the susceptor 116.

As a specific example, the susceptor 116 may be or comprise steel. The susceptor 116 may be a sheet of mild steel with a thickness of between about 10 μm and about 50 μm, for example a thickness of about 25 μm. Providing the susceptor 116 with only a relatively small thickness may help to reduce the time required to heat the susceptor in use. The susceptor 116 may be integrated into the apparatus 105, for example as opposed to being integrated with the aerosol generating material 164, which aerosol generating material may be disposable. Nonetheless, the susceptor 116 may be removable from the apparatus 115, for example to enable replacement of the susceptor 116 after use, for example after degradation due to thermal and oxidation stress over use. The susceptor 116 may therefore be "semi-permanent", in that it is to be replaced infrequently. Mild steel sheets or foils or nickel coated steel sheets or foils as susceptors 116 may be particularly suited to this purpose as they are durable and hence, for example, may resist damage over multiple uses and/or multiple contact with aerosol generating material 164, for example. A sheet form may allow a high degree of efficiency of heat coupling from the susceptor 116 to the aerosol generating material 164.

The Curie temperature $T_c$ of iron is 770° C. The Curie temperature $T_c$ of mild steel may be around 770° C. The Curie temperature $T_c$ of cobalt is 1127° C. In one example, the mild steel susceptor 116 may be heated to temperatures in the range of about 200° C. to about 300° C., which may be the working range of the aerosol generating device 150. The change in saturation magnetization of mild steel at 250° C. is less than 10% relative to the value at ambient temperatures. Hence the change in inductance L between temperatures in the working range of temperatures is relatively small and can be assumed to be constant for the steel susceptor 116. Hence the change in bandwidth B of the peak of the response of the circuit 100 can be directly related to the resistance R of the circuit 100 (via equation (2)), and hence the temperature of the steel susceptor 116. Hence in this case, measuring the bandwidth B of the peak will allow for a simple and accurate determination of the temperature of the susceptor 116.

In some examples, the controller 114 may be arranged to determine only one of the resonant frequency $f_r$ or the bandwidth B to determine the temperature of the susceptor. In some examples, the controller 114 may be arranged to determine either the resonant frequency $f_r$ or the bandwidth B to determine the temperature of the susceptor 116, depending on the type of susceptor 116 used and/or the working range of temperatures of the device 350. In some examples, which of the resonant frequency $f_r$ or the bandwidth B the controller 114 is to use to determine the temperature of the susceptor 116 is pre-set, or predetermined in the controller 114 and/or the overall device 150. In some examples, the controller 114 may be arranged to determine both the resonant frequency $f_r$ and the bandwidth B, and use both to determine the temperature of the susceptor 116. For example the controller may be arranged to take an average of the temperature as determined using the resonant frequency $f_r$ and the bandwidth B, and determine this as the temperature of the susceptor 116.

As mentioned above, the controller 114 is arranged to determine the temperature of the susceptor 116 based on the determined frequency characteristic, for example the resonant frequency $f_r$ of the circuit 100, or the bandwidth B of the peak of the frequency response 300 of the circuit 100. There are various ways in which this can be achieved.

In one example, the controller 114 is arranged to determine data indicative of the temperature as a function of the frequency characteristic; and determine the temperature based on the determined data and the determined frequency characteristic.

For example, the data may comprise a series of data points of the temperature measured as a function of the first characteristic. For example, the controller 114 may store in a memory (not shown) calibration data that maps the frequency characteristic onto the temperature of the susceptor 116. For example, the temperature as a function of the first characteristic may be monotonic. For example, the calibration data may be determined during manufacture of the device 350 or controller 114 by measuring the frequency characteristic of the circuit as a function of the temperature of the susceptor 116 as determined using a thermometer, such as a thermocouple, for example. This calibration data may then be stored in the device 350 or controller 114, for example as a look-up table in a memory (not shown) of the device 350 or controller 114. In use, the controller 114 may determine the frequency characteristic of the peak of the frequency response 300 of the resonance circuit 100, and use the determined frequency characteristic to look up the corresponding temperature of the susceptor 116 from the calibration data. This may be useful in cases where there the relationship between frequency characteristic and temperature is complicated, and hence may provide for an accurate determination of the temperature.

As another example, the controller 114 or device 350 may store data comprising one or more parameters of a functional form describing the temperature as a function of the frequency characteristic. For example, it may be assumed that the frequency characteristic varies linearly with the temperature of the susceptor 116. In this case, a functional form describing the temperature T of the susceptor 116 as a function of frequency characteristic F may be $T=aF+b$, where a and b are constants parameterizing the functional form. These parameters may be determined during the manufacturing process of the controller 114 or device 350, and stored in a memory (not shown) of the controller or device 350. In use, the controller may determine the frequency characteristic of the peak of the frequency response 300 of the resonance circuit 100, and use the parameters a and b stored in memory to calculate the temperature of the susceptor 116. It will be appreciated that other functional forms may be used as required, for example non-linear functional forms, for example polynomial functions parameterized as appropriate. This may be useful as the storing of the parameters uses less storage space as compared to, for example, storing a data series of frequency characteristic and temperature.

In some examples, the data may simply be a constant of proportionality between the temperature and the frequency characteristic. This constant may be stored in a memory (not shown) and used by the controller to calculate the temperature of the susceptor 116 directly from the frequency characteristic. This may be useful as it is computationally simple and involves the storage of one parameter which may reduce storage capacity required.

In cases where the frequency characteristic is the bandwidth B of the peak of the frequency response 300 of the resonance circuit 100, the controller 114 may be arranged to determine the resistance R of the resonance circuit 100 using equation (2) with a known, e.g. predetermined value of inductance L. The temperature of the susceptor 116 may then be determined from the determined resistance R. For example, the contribution to the resistance R apart from the contribution of the susceptor 116 may be known or predetermined and assumed to remain constant. The resistance of the susceptor 116 may then be determined as the difference between the determined resistance R and the contribution to the resistance R apart from the contribution of the susceptor 116. As another example, the contribution to the resistance R apart from the contribution of the susceptor 116 may be assumed to be negligible, and hence the determined resistance R equated with the resistance of the susceptor. The temperature of the susceptor 116 may then be determined by multiplying the resistance of the susceptor by a constant, for example a temperature-resistance constant of the susceptor 116, which may be stored in a memory (not shown) of the controller 114 or device 150. Different materials have different temperature-resistance constants. Hence the controller 114 may store a plurality of temperature-resistance constants for different materials, and determine the appropriate temperature-resistance constant to use in determining the temperature of the susceptor 116 according to the material that the susceptor comprises 116. For example, the material that the susceptor 116 comprises may be known to the controller 114 by way of user input, or from another input by which the susceptor 116 may be identified to the controller 114. This may be useful as it provides an accurate temperature determination whilst allowing flexibility in the susceptors 116 used.

In some examples, the controller 114 may be arranged to determine a reference characteristic indicative of the frequency characteristic at a reference temperature; compare the determined frequency characteristic to the determined reference characteristic; and determine the temperature of the susceptor 116 based on the comparison of the determined frequency characteristic to the reference characteristic.

For example, the controller 114 may be arranged to determine the frequency characteristic when it is known or may be assumed that the susceptor 116 is at a certain temperature. For example, the controller 114 may be arranged to determine the frequency characteristic on an initiation of the device 150 (for example using the methods as described above), when it may be assumed that the temperature of the susceptor 116 is ambient temperature, for example 20° C. The controller 114 may then store this determined frequency characteristic as a reference frequency characteristic at the reference temperature of 20° C. At a later stage, for example when the susceptor 116 is being inductively heated, the controller 114 may determine again the frequency characteristic. The controller 114 may then compare this determined frequency characteristic with the reference frequency characteristic. For example, the controller 114 may calculate the difference between the determined frequency characteristic and the reference frequency characteristic. The controller 114 may then determine the temperature of the susceptor 116 based on this difference. For example, the difference may be mapped onto a temperature of the susceptor 116 in similar ways to as described above, for example via pre-stored calibration data, or a calibration function, or a constant of proportionality.

Determining the temperature of the susceptor 116 based on a comparison of the determined frequency characteristic to a reference characteristic determined at a reference temperature removes the need for an assumption of the frequency characteristic of the resonance circuit at a given temperature, and hence provides a more accurate determination of temperature. Further the temperature determination is more robust to changes of the susceptor 116, or the resonance circuit 100, or the device as a whole 350. For example, the susceptor 116 may be replaceable. For example, the susceptor 116 may be disposable and for example integrated with the aerosol generating material 164 that it is arranged to heat. The determination of the reference frequency characteristic may therefore account for differences between different susceptors 116, and/or differences in the placement of the susceptor 116 relative to the inductor 108, as an when the susceptor 116 is replaced. Furthermore, the inductor 108, or indeed any component of the resonance circuit 100, may be replaceable, for example after a certain use, or after damage. Similarly, the determination of the reference frequency characteristic may therefore account for differences between different inductors 108, and/or differences in the placement of the inductor 108 relative to the susceptor 116, as and when the inductor 108 is replaced.

Accordingly, the controller 114 may be arranged to measure the reference characteristic substantially on start-up of the aerosol generating device 150 and/or substantially on installation of a new and/or replacement susceptor 116 into the aerosol generating device 150 and/or substantially on installation of a new and/or replacement inductor 108 into the aerosol generating device 150.

Figure 4:
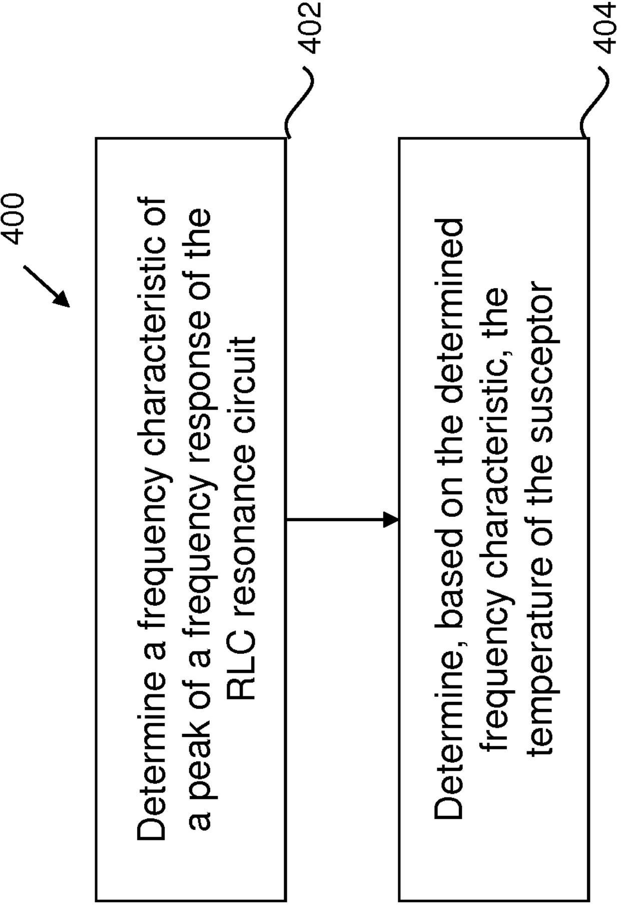
FIG. 4 is a flow diagram illustrating schematically an example method.

FIG. 4 is a flow diagram schematically illustrating a method 400 of determining a temperature of a susceptor 116 of an aerosol generating device 105, the susceptor 116 for inductive heating by a RLC resonance circuit 100. In step 402, the method 400 comprises determining a frequency characteristic of a peak of a frequency response 300 of the RLC resonance circuit 100. As mentioned above, the frequency characteristic may be a resonant frequency $f_r$ of the resonance circuit 100 or may be the bandwidth B of the peak of the frequency response 300 of the circuit 100. The frequency characteristic may be obtained for example using the techniques described above. In step 404, the method 400 comprises determining, based on the determined frequency characteristic, the temperature of the susceptor 116. The temperature of the susceptor may be obtained from the determined frequency characteristic, for example, using the techniques described above.

The controller 114 may comprise a processor and a memory (not shown). The memory may store instructions executable by the processor. For example, the memory may store instructions which, when executed on the processor, may cause the processor to perform the method 400 described above. The instructions may be stored on any suitable storage medium, for example, on a non-transitory storage medium.

Although some of the above examples referred to the frequency response 300 of the RLC resonance circuit 100 in terms of a current I flowing in the RLC resonance circuit 100 as a function of the frequency f at which the circuit is driven, it will be appreciated that this need not necessarily be the case, and in other examples the frequency response 300 of the RLC circuit 100 may be any measure relatable to the current I flowing in the RLC resonance circuit as a function of the frequency f at which the circuit is driven. For example the frequency response 300 may be a response of an impedance of the circuit to frequency f, or as described above may be a voltage measured across the inductor, or a voltage or current resulting from the induction of current into a pick-up coil by a change in current flowing in a supply voltage line or track to the resonance circuit, or a voltage or current resulting from the induction of current into a sense coil by the inductor 108 of the RLC resonance circuit, or a signal from a non-inductive pick up coil or non-inductive field sensor such as a Hall Effect device, as a function of the frequency f at which the circuit is driven. In each case, a frequency characteristic of a peak of the frequency response 300 may be determined.

Although in some of the above examples the frequency characteristic was a bandwidth B of a peak of a frequency response 300, it will be appreciated that this need not necessarily be the case, and the frequency characteristic may be indicative of the bandwidth of the peak. For example, the full width or half-width of the peak at an arbitrary predetermined response amplitude, or fraction of a maximum response amplitude, may be used. This characteristic indicative of the bandwidth of the peak can be used in place of the bandwidth, where required with appropriate scaling factors applied. It will also be appreciated that in other examples, the so called "Q" or "Quality" factor or value of the resonance circuit 100, which may be related to the bandwidth B and the resonant frequency $f_r$ of the resonance circuit 100 via $Q=f_r/B$, may be determined and/or or measured and used as a frequency characteristic in place of the bandwidth B and/or resonant frequency $f_r$, similarly to as described in the examples above with appropriate factors applied. It will therefore be appreciated that in some examples the Q factor of the circuit 100 may be measured or determined, and the resonant frequency $f_r$, of the circuit 100, bandwidth B of the circuit 100, and/or temperature of the susceptor 116 may be determined based on the determined Q factor accordingly.

Although the above examples referred to a peak as associated with a maximum, it will be readily appreciated the this need not necessarily be the case and that, depending on the frequency response 300 determined and the way in which it is measured, the peak may be associated with a minimum. For example, at resonance, the impedance of the RLC circuit 100 is minimum, and hence in cases where the impedance as a function of drive frequency f is used as a frequency response 300 for example, the peak of the frequency response 300 of the RLC circuit will be associated with a minimum.

Although in some of the above examples it is described that in order to determine the frequency characteristic of the peak of the frequency response 300 of the RLC resonance circuit, the controller 114 is arranged to measure a frequency response 300 of the RLC resonance circuit 100, it will be appreciated that this need not necessarily be the case, and in other examples the controller 114 may determine the frequency characteristic by analyzing frequency response data communicated to it by a separate measurement or control system (not shown), or may determine the frequency characteristic directly by being communicated the frequency characteristic by a separate control or measurement system, for example. The controller 114 may then determine the temperature of the susceptor 116 based on the determined frequency characteristic, for example by the techniques as described above.

Although in some of the above examples, it is described that the controller 114 is arranged to determine the temperature of the susceptor 116, it will be appreciated that this need not necessarily be the case, and in other examples an apparatus that need not necessarily be or comprise the controller 114 and may be arranged to determine the frequency characteristic and determine the temperature of the susceptor based on the determined frequency characteristic, for example by measuring the frequency response 300 itself, or by being communicated frequency response data or the frequency characteristic as described above, for example. The apparatus may be arranged to determine the temperature from the determined frequency characteristic, for example by the methods described above. It will be appreciated that this apparatus or the controller 114 need not necessarily be an integral part of the aerosol generating device 150, and may, for example, be a separate apparatus or controller 114 for use with the aerosol generating device 150.

Although in the above examples it is described that the apparatus or controller 114 is for determining a temperature of a susceptor of an aerosol generating device, this need not necessarily be the case and in other examples the apparatus or controller 114 may be for determining a temperature of a susceptor of any device where the susceptor is for inductive heating by a RLC resonance circuit, for example any inductive heating device.

Although in the above examples it is described that the RLC resonance circuit is driven by the H-Bridge driver 102, this need not necessarily be the case, and in other examples the RLC resonance circuit 100 may be driven by any suitable driving element for providing an alternating current in the resonance circuit 100, such as an oscillator or the like.

The above examples are to be understood as illustrative examples of the invention. It is to be understood that any feature described in relation to any one example may be used alone, or in combination with other features described, and may also be used in combination with one or more features of any other of the examples, or any combination of any other of the other examples. Furthermore, equivalents and modifications not described above may also be employed without departing from the scope of the invention, which is defined in the accompanying claims.

The invention claimed is:

1. An apparatus for determining a temperature of a susceptor of an aerosol generating device, the susceptor being for inductive heating by a RLC resonance circuit, the apparatus comprising a controller, wherein at one or more of: substantially on start-up of the aerosol generating device, substantially on installation of a new or replacement susceptor into the aerosol generating device, or substantially on installation of a new or replacement inductor into the aerosol generating device, the controller is configured to:

determine a frequency characteristic of a peak of a frequency response of the RLC resonance circuit at a reference temperature; and store the frequency characteristic as a stored reference characteristic, and wherein, at a later stage when the susceptor is being inductively heated, the controller is arranged to:

determine the frequency characteristic again, determine the temperature of the susceptor based on a comparison of the frequency characteristic to the stored reference characteristic; and wherein the controller is further configured to control the heating of the aerosol generating material by the RLC resonance circuit based on the determined temperature of the susceptor;

wherein the RLC resonance circuit is contained within a hand-held body of the aerosol generating device; and wherein the frequency characteristic is a resonant frequency of the RLC resonance circuit, and/or the frequency characteristic is, or is indicative of, a bandwidth of the peak of the frequency response of the RLC circuit, wherein the controller determines the temperature of the susceptor.

2. The apparatus according to claim 1, wherein the controller is further arranged to:

determine data indicative of the temperature as a function of the frequency characteristic; and wherein the temperature is determined based on the determined data and the determined frequency characteristic.

3. The apparatus according to claim 2, wherein the data comprises one or more parameters of a functional form describing the temperature as a function of the frequency characteristic.

4. The apparatus according to claim 2, wherein the data is a constant of proportionality between the temperature and the frequency characteristic.

5. The apparatus according to claim 2, wherein the data comprises a series of data points of the temperature measured as a function of the frequency characteristic.

6. The apparatus according to claim 1, wherein the controller is further arranged to:

determine, based on the determined frequency characteristic, a resistance of the RLC circuit; and wherein the determination of the temperature is based on the determined resistance of the RLC circuit.

7. The apparatus according to claim 6, wherein the controller is further arranged to:

determine a temperature-resistance constant of the susceptor; and wherein the determination of the temperature is based on the determined resistance and the determined temperature-resistance constant.

8. The apparatus according to claim 1, wherein the controller is further arranged to:

measure an electrical property of the RLC circuit as a function of a driving frequency at which the RLC circuit is driven; and wherein the determination of the frequency characteristic is based on the measured electrical property of the RLC circuit as a function of a driving frequency at which the RLC circuit is driven.

9. The apparatus according to claim 8, wherein the electrical property is a voltage measured across an inductor of the RLC circuit, the inductor being for energy transfer to the susceptor.

10. The apparatus according to claim 8, wherein the measurement of the electrical property is a passive measurement.

11. The apparatus according to claim 10, wherein the electrical property is indicative of a current induced into a sense coil by an inductor of the RLC circuit, the inductor being for energy transfer to the susceptor.

12. The apparatus according to claim 10, wherein the electrical property is indicative of a current induced in a pick-up coil by a supply voltage element, the supply voltage element being for supplying voltage to a driving element, the driving element being for driving the RLC circuit.

13. The apparatus according to claim 1, wherein the controller is arranged to determine the temperature of the susceptor based on a comparison of the frequency characteristic to the stored reference characteristic by a calculation comprising the comparison.

* * * * *